United States Patent [19]

Ibamoto et al.

[11] 4,126,889
[45] Nov. 21, 1978

[54] PROTECTIVE CIRCUIT FOR D.C. CIRCUIT

[75] Inventors: Masahiko Ibamoto; Shigeru Kuriyama, both of Katsuta; Genichi Matsumoto, Hitachi, all of Japan

[73] Assignee: Hitachi, Ltd., Japan

[21] Appl. No.: 787,844

[22] Filed: Apr. 15, 1977

[30] Foreign Application Priority Data

Apr. 28, 1976 [JP] Japan .................................. 51-47762

[51] Int. Cl.$^2$ .............................................. H02H 3/24
[52] U.S. Cl. ...................................... 361/92; 318/341
[58] Field of Search ................ 318/341, 345 R, 345 G; 361/92; 363/56, 57, 124

[56] References Cited

U.S. PATENT DOCUMENTS

| | | | |
|---|---|---|---|
| 3,484,652 | 12/1969 | Thiele | 361/92 |
| 3,689,818 | 9/1972 | Morton et al. | 318/341 X |
| 3,902,105 | 8/1975 | Delaney et al. | 318/341 |

Primary Examiner—Harry E. Moose, Jr.
Attorney, Agent, or Firm—Craig & Antonelli

[57] ABSTRACT

A protective circuit for protecting a main d.c. circuit of the kind comprising a d.c. power source, a d.c. load, a contactor and a chopper. In the protective circuit, a resistor is connected in parallel with the series-connected contactor and load to permit continuous application of power supply voltage across the chopper. A circuit is connected to the connection point of the load and chopper to provide a signal synchronous with on-off of the chopper, and the output signal of this circuit and a signal corresponding to a chopper-on signal are applied to a logic circuit which provides the logical sum of these inputs for the detection of commutation failure of the chopper. The output of the logic circuit turns on a thyristor for deenergizing the contactor thereby disconnecting the load from the power source.

11 Claims, 6 Drawing Figures

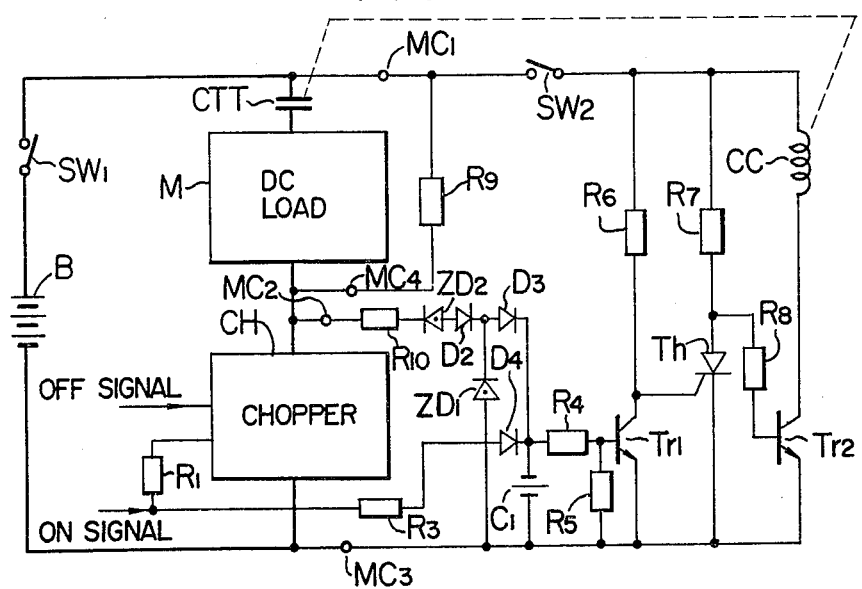
F I G. 3
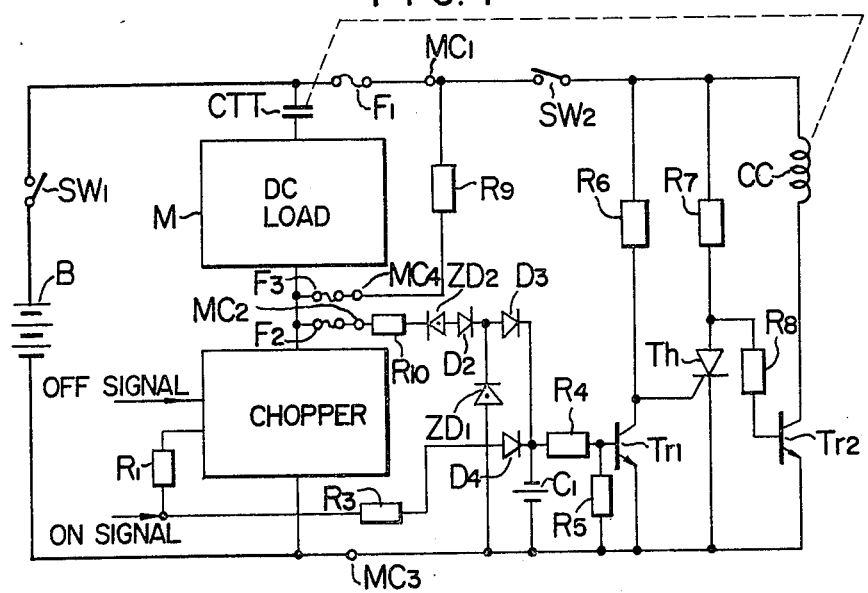
F I G. 4

PROTECTIVE CIRCUIT FOR D.C. CIRCUIT

BACKGROUND OF THE INVENTION

This invention relates to a d.c. circuit using a chopper for controlling power supplied from a d.c. power source to a d.c. load, and more particularly to improvements in a protective circuit which detects commutation failure of the chopper to disconnect the d.c. load from the d.c. power source to protect the d.c. circuit.

As is commonly known, a chopper is generally composed of a main thyristor, an auxiliary thyristor, and commutation means comprising a commutation reactor and a commutation capacitor. In the chopper, the main thyristor is turned on to permit flow of direct current to a d.c. load from a d.c. power source, and this state is so called a "chopper-on state." The auxiliary thyristor is turned on to turn off the main thyristor by the action of the commutation means thereby prohibiting flow of direct current to the d.c. load from the d.c. power source, and this state is so called a "chopper-off state."

In the description which follows, a "chopper-on signal" refers to a signal which turns on the main thyristor, and a "chopper-off signal" refers to a signal which turns on the auxiliary thyristor.

On-off control of such a chopper is disclosed in, for example, U.S. Pat. Nos. 3,903,465 and 3,914,672.

However, commutation failure is an inevitable problem for a chopper of this kind in view of the structural principle of the same. That is, commutation failure occurs when the auxiliary thyristor fails to turn on for some reason in spite of the fact that the chopper-off signal has been applied to the auxiliary thyristor for turning off the main thyristor from its conducting state, or when the commutation energy accumulating in the commutation means is not enough to turn off the main thyristor in spite of the fact that the auxiliary thyristor has been turned on in response to the application of the chopper-off signal thereto.

Such commutation failure results in continuous flow of direct current to the d.c. load from the d.c. power source, and the resultant state of overcurrent will give rise to thyristor destruction and other trouble. Thus, in the event of commutation failure of the chopper, this commutation failure must be immediately detected to disconnect the d.c. load from the d.c. power source as quickly as possible for protecting the equipment. In this case, commutation failure of the chopper is detected on the basis of logical judgement of the relation between the on-off gate signal applied to the chopper and the actual on-off operation of the chopper. A protective circuit based on such logical judgement for the purpose of detection of commutation failure of the chopper has the advantage of a very short length of time required for the detection of commutation failure and is employed in electromobiles, battery-operated fork-lift trucks, etc.

Such a commutation failure protective circuit is generally formed on a printed circuit board. Means such as multiconnector terminals are generally used to electrically connect this protective circuit with the main circuit including the d.c. power source, d.c. load and chopper. However, trouble such as malcontact or wire-breaking occurring in the interface between the main circuit and the protective circuit will result in impossibility of detection of commutation failure of the chopper, giving rise to such a very dangerous state as burnout of the parts including the thyristors or runaway of the vehicle.

SUMMARY OF THE INVENTION

It is a primary object of the present invention to provide a novel and improved protective circuit which is capable of reliably protecting the main d.c. circuit by disconnecting the d.c. load from the d.c. power source even when malcontact or wire-breaking trouble occurs in the interface between the main d.c. circuit and the protective circuit.

In accordance with one aspect of the present invention which attains the above and other object, there is provided a protective circuit for protecting a main d.c. circuit which is composed of a d.c. power source, a d.c. load connected at one terminal thereof to one terminal of the d.c. power source through switching means, and a chopper connected at one terminal thereof to the other terminal of the d.c. load and at the other terminal thereof to the other terminal of the d.c. power source, the protective circuit comprising first means including a resistor connected in parallel with the series connection of the switching means and the d.c. load, second means connected at one terminal thereof to the one terminal of the chopper for delivering from the other terminal thereof a signal synchronous with on-off of the chopper, third means for detecting commutation failure of the chopper to produce an output signal on the basis of the output signal of the second means and a signal corresponding to a chopper-on signal applied to the chopper, and fourth means for actuating the switching means in response to the output signal of the third means thereby disconnecting the d.c. load from the d.c. power source.

BRIEF DESCRIPTION OF THE DRAWINGS

FIG. 3 is a circuit diagram of an embodiment of the protective circuit according to the present invention.

FIGS. 4 to 6 are circuit diagrams of other embodiments of the present invention.

DESCRIPTION OF THE PREFERRED EMBODIMENTS

For a better understanding of the present invention, a prior art protective circuit will be described with reference to FIG. 1 before describing the present invention in detail.

Figure 1:
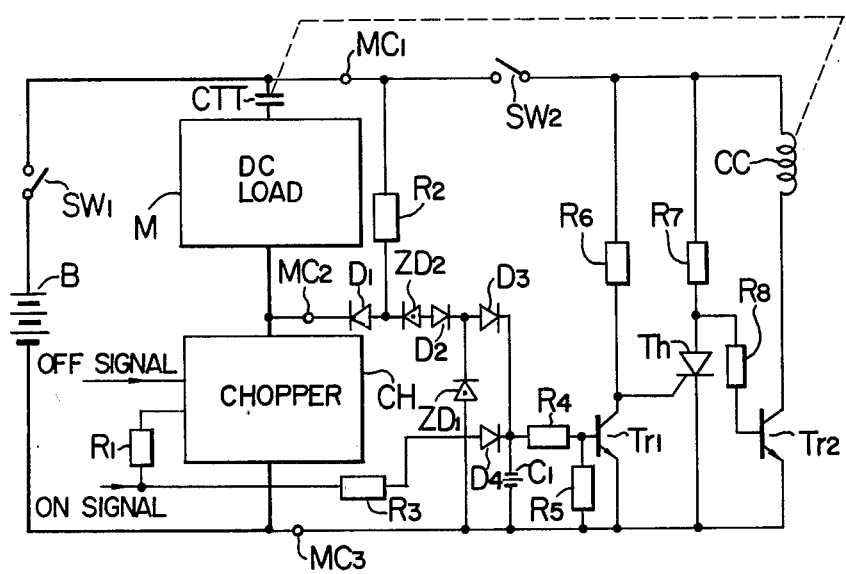
FIG. 1 is a circuit diagram of a prior art protective circuit used for protecting a d.c. circuit.

FIG. 1 shows an example of a prior art protective circuit used for protecting a d.c. circuit, and such a circuit is disclosed in a Japanese Patent Appln. No. 19842/75 filed in the Japanese Patent Office on Feb. 15, 1975, by Hitachi, Ltd., the common assignee of the present application, and laid open on Aug. 20, 1976 as Japanese Laid-open Patent Publn. No. 95234/76.

Referring to FIG. 1, the main circuit comprises a d.c. power source B, a main circuit switch $SW_1$, a contactor CTT, a d.c. load M, for example, a d.c. motor and a chopper CH. The protective circuit is connected to three points of the main circuit through multiconnector terminals $MC_1$, $MC_2$ and $MC_3$ respectively. These three points are the connection points between the contactor CTT and the d.c. power source B, between the d.c. load M and the chopper CH, and between the chopper CH and the d.c. power source B.

In response to the closure of the main circuit switch $SW_1$, the power supply voltage is applied from the d.c.

power source B to a capacitor $C_1$ through a resistor $R_2$, a Zener diode $ZD_2$, and diodes $D_2$ and $D_3$. Base current is supplied from the capacitor $C_1$ to a transistor $T_{r1}$ through a resistor $R_4$ to turn on this transistor $T_{r1}$. At this time, the chopper CH is not still placed in operation. Then, when a key switch $SW_2$ is closed, base current is supplied to a transistor $T_{r2}$ through resistors $R_7$ and $R_8$ to turn on this transistor $T_{r2}$. Energizing current is supplied to the coil CC of the contactor CTT to make the contactor CTT. Since the transistor $T_{r1}$ is conducting at this time, no voltage is applied to the gate of a thyristor $T_h$. Therefore, the thyristor $T_h$ is not turned on.

As a result of the actuation of the contactor CTT, the main circuit loop is now established which is traced from the d.c. power source B to main circuit switch $SW_1$ to contactor CTT to d.c. load M to chopper CH and to the d.c. power source B. The chopper CH is turned on when a chopper-on signal is applied thereto from a gate control circuit (not shown) through a resistor $R_1$ in the above state. The chopper CH is turned off in response to the application of a chopper-off signal thereto. However, this chopper turning-off occurs with a delay time corresponding to the commutation interval (generally in the order of several hundred microseconds). In addition to the d.c. load M, a circuit including a diode $D_1$ and the resistor $R_2$ is also connected to the chopper CH. The anode potential of the diode $D_1$ drops to nearly zero in the conducting state of the chopper CH, while it rises in the non-conducting state of the chopper CH. Thus, whether the chopper CH is conducting or non-conducting can be precisely detected by detecting the anode potential of the diode $D_1$. Commutation failure of the chopper CH can therefore be readily detected by comparing the anode potential of the diode $D_1$ with the chopper-on signal level thereby logically detecting the fact that whether the chopper CH is conducting in the absence of the chopper-on signal. To this end, in the protective circuit shown in FIG. 1, the anode voltage of the diode $D_1$ is passed through the Zener diode $ZD_2$ and diode $D_2$ and is then clipped to a suitable level by a Zener diode $ZD_1$. This voltage signal and the chopper-on signal passed through a resistor $R_3$ are applied to diodes $D_3$ and $D_4$ to obtain the logical sum of these signals. The manner of decision is such that commutation failure has occurred when the voltage representing the logical sum of these signals is null.

Figure 2:
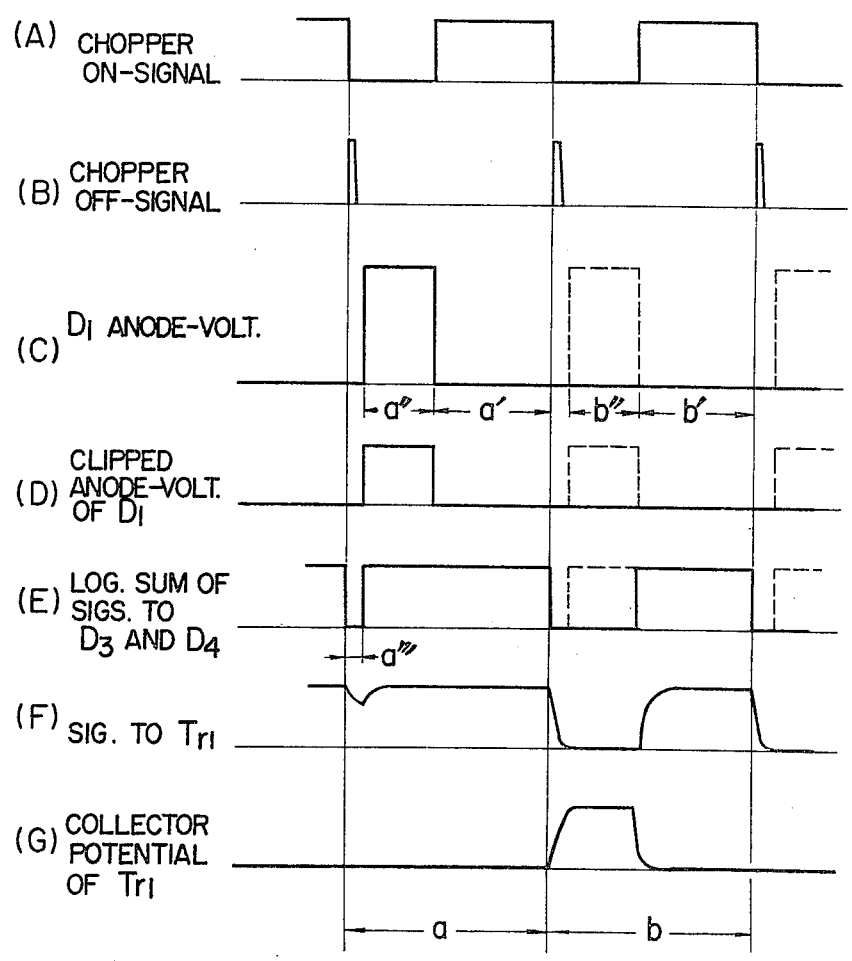
FIG. 2 is a waveform diagram for illustrating the operation of the prior art protective circuit shown in FIG. 1.

FIG. 2 shows voltage waveforms appearing at various points in FIG. 1 when the chopper CH is normally operating and when commutation failure occurs. Waveforms of the chopper-on signal and chopper-off signal are shown in (A) and (B) of FIG. 2 respectively. The anode voltage of the diode $D_1$ drops to nearly zero as shown in the portion $a'$ of the period $a$ in (C) of FIG. 2 when the chopper CH is turned on in response to the application of the chopper-on signal having the waveform shown in (A) of FIG. 2. When the chopper CH is turned off in response to the application of the chopper-off signal having the waveform shown in (B) of FIG. 2, the anode voltage of the diode $D_1$ rises as shown in the portion $a''$ of the period $a$ in (C) of FIG. 2. However, a clipped waveform as shown in (D) of FIG. 2 is actually applied to the diode $D_3$ since the anode voltage of the diode $D_1$ is clipped to a suitable level by the Zener diode $ZD_1$. The voltage signal waveform representing the logical sum of the signals applied to the diodes $D_3$ and $D_4$ has a low level during the commutation interval as shown in the part $a'''$ of the period $a$ in (E) of FIG. 2. Actually, however, this voltage signal waveform is smoothed by the capacitor $C_1$, and a waveform as shown in the period $a$ in (F) of FIG. 2 is applied to the transistor $T_{r1}$. Since the capacitor $C_1$ acts to smooth the voltage signal even in the low level portion appearing during the commutation interval, base current is continuously supplied to the transistor $T_{r1}$ through the base resistor $R_4$. Therefore, the transistor $T_{r1}$ is kept in the conducting state so long as the chopper CH is normally operating.

However, when the chopper CH would not be turned off in spite of the application of the chopper-off signal having the waveform shown in (B) of FIG. 2, that is, when commutation failure of the chopper CH occurs, the anode voltage of the diode $D_1$ does not rise although it should have a voltage waveform as shown by the broken lines in the portion $b''$ of the period $b$ in (C) of FIG. 2 in the normally operating state of the chopper CH. In such a case, the terminal voltage of the capacitor $C_1$ may be reduced to zero. In this event, the transistor $T_{r1}$ is cut off, and its collector potential rises in a manner as shown by a waveform in the period $b$ in (G) of FIG. 2, with the result that the thyristor $T_h$ is turned on. Consequently, no base current is supplied to the transistor $T_{r2}$, and the transistor $T_{r2}$ is cut off to brake the contactor CTT.

Suppose now that trouble such as malcontact or wire-breaking trouble as aforementioned occurs in the interface between the main circuit and the protective circuit. When malcontact or wire-breaking trouble occurs in the multiconnector terminals $MC_1$ and $MC_3$, no energizing current is supplied to the coil CC of the contactor CTT so that the contactor CTT is broken. In such a case, the vehicle is not driven any more, and the safety can be insured.

However, when malcontact or wire-breaking trouble occurs solely in the multiconnector terminal $MC_2$, the contactor CTT is not broken, and the chopper CH operates in response to the application of the gate signal. In the event of commutation failure of the chopper CH in the above situation, the anode voltage of the diode $D_1$ would not drop to zero since the multi-connector terminal $MC_2$ is now disconnected. The power supply voltage continues to be applied to the capacitor $C_1$ through the resistor $R_2$, Zener diode $ZD_2$ and diodes $D_2$ and $D_3$, to keep the transistor $T_{r1}$ in the conducting state. Thus, commutation failure of the chopper CH is not detected at all. That is, detection of commutation failure of the chopper CH becomes impossible when malcontact or wire-breaking occurs in the multiconnector terminal $MC_2$ in such a circuit. As a result, an overcurrent flows through the main circuit tending to destroy the thyristors in the chopper or to burn the d.c. load. Further, there occurs a very dangerous state such as runaway of the vehicle.

With a view to obviate such a serious danger, the present invention provides improvements, in the prior art circuit, in which the route for applying the voltage to the commutation failure detection circuit is altered so that the contactor CTT can be necessarily broken to ensure the safety when trouble such as connector malcontact or lead wire breaking occurs in the interface between the main circuit and the protective circuit.

FIG. 3 shows an embodiment of the present invention which provides an improvement in the prior art arrangement shown in FIG. 1. The circuit of the present invention shown in FIG. 3 differs from that shown in FIG. 1 in that resistors $R_9$ and $R_{10}$ are provided in place of the diode $D_1$ and resistor $R_2$. The resistor $R_{10}$ in FIG. 3 has a resistance value which is the same as that of the resistor $R_2$ in FIG. 1. The resistor $R_9$ is connected to the main circuit through the multiconnector terminal $MC_1$ and also through another multiconnector terminal $MC_4$, while the resistor $R_{10}$ is connected to the main circuit through the multiconnector terminal $MC_2$.

The resistor $R_9$ is connected to the main circuit through the multiconnector terminals $MC_1$ and $MC_4$ for the reasons described presently. Assume now the multiconnector terminals $MC_1$ and $MC_4$ are not connected through the resistor $R_9$. No voltage can be applied across the chopper CH before the establishment of the main circuit loop, that is, in the state in which the contactor CTT is broken. Neither on signal nor off signal is being applied to the chopper CH at this time. Consequently, the transistor $T_{r1}$ is maintained in the non-conducting state. In this situation, even if the key switch $SW_2$ is closed to make the contactor CTT for completing the main circuit loop, the transistor $T_{r2}$ is kept in the non-conducting state resulting in impossibility of making the contactor CTT. This means that the protective circuit would decide erroneously that commutation failure of the chopper CH occurs, prior to the completion of the main circuit loop. To avoid such a situation prior to the completion of the main circuit loop, the power supply voltage is continuously applied across the chopper CH through a resistor $R_9$, so as to render the transistor $T_{r1}$ conductive so that the protective circuit can decide that the operation is normal.

The successive operating steps of the circuit shown in FIG. 3 will be described in order. In response to the turning-on of the main circuit switch $SW_1$, the power supply voltage is applied from the d.c. power source B to the capacitor $C_1$ through the resistors $R_9$, $R_{10}$, Zener diode $ZD_2$, and diodes $D_2$, $D_3$. Base current is supplied from the capacitor $C_1$ to the transistor $T_{r1}$ through the resistor $R_4$ to turn on the transistor $T_{r1}$. The combined resistance value in this route is larger than that in FIG. 1 by the resistance value of the resistor $R_9$. However, the entirely same voltage level as that in FIG. 1 can be applied to the capacitor $C_1$ by suitably selecting the resistance value of the resistor $R_9$, although less current may be supplied to the Zener diode $ZD_1$. Therefore, the conducting state of the transistor $T_{r1}$ in FIG. 3 is also entirely the same as that in FIG. 1.

Then, when the key switch $SW_2$ is closed, base current is supplied to the transistor $T_{r2}$ through the resistors $R_7$ and $R_8$ to turn on the transistor $T_{r2}$ thereby making the contactor CTT as in the case of FIG. 1.

The actuation of the contactor CTT completes the main circuit loop. Since the internal resistance of the d.c. load M is commonly very low, the anode voltage of the chopper CH is approximately equal to the power supply voltage of the d.c. power source B. The resistance value of the resistor $R_{10}$ in FIG. 3 is selected to be approximately equal to that of the resistor $R_2$ in FIG. 1. Therefore, the current value flowing through the Zener diode $ZD_2$ and diodes $D_2$, $D_3$ in FIG. 3 is approximately equal to that in FIG. 1.

The anode voltage of the chopper CH drops to zero when the chopper CH is turned on, and no current flows now through the Zener diode $ZD_2$ and diodes $D_2$, $D_3$. Thus, after the contactor CTT has been made the state of the commutation failure detection circuit in FIG. 3 is exactly the same as that in FIG. 1, and the commutation failure detecting function of this circuit is the same as that in FIG. 1.

Suppose now that malcontact occurs in the multiconnector terminals in the circuit shown in FIG. 3. Malcontact occurring in the multiconnector terminal $MC_1$ or $MC_3$ does not jeopardize the safety in any way since the contactor CTT would not be made in such a case. Malcontact occurring in the multiconnector terminal $MC_2$ results in reduction to zero of the current value flowing through the resistor $R_{10}$, Zener diode $ZD_2$, and diodes $D_2$, $D_3$. In a certain period, the voltage of the capacitor $C_1$ is null, and the contactor CTT is broken as in the case of detection of commutation failure. When malcontact occurs in the multiconnector terminal $MC_4$, no base current is supplied to the transistor $T_{r1}$ in spite of the closure of the main circuit switch $SW_1$. Therefore, as soon as the key switch $SW_2$ is turned on, the thyristor $T_h$ is turned on, and the transistor $T_{r2}$ does not conduct to prevent the contactor CTT from being made. Suppose then that malcontact occurs in the multiconnector terminal $MC_4$ after the contactor CTT has been made. In such a case, the transistor $T_{r1}$ is kept in the conducting state since the base current is supplied thereto through the load M, resistor $R_{10}$, Zener diode $ZD_2$ and diodes $D_2$, $D_3$. Therefore, the contactor CTT would not be broken, and the chopper CH can operate. It is needless to say that, upon occurrence of commutation failure in such a situation, the commutation failure is immediately detected to break the contactor CTT.

It will thus be seen that the protective circuit exhibits the commutation failure detecting function whenever malcontact occurs in any one of the multiconnector terminals $MC_1$ to $MC_4$. Therefore, the aforementioned embodiment of the present invention acts necessarily to ensure the safety against trouble such as malcontact occurring in the multiconnector terminals or breaking of the lead wires, thereby preventing runaway of the vehicle or burn-out of the chopper CH and remarkably improving the reliability.

A high voltage is applied across the chopper CH due to the inductance of the load M in the transient state in which the chopper CH is turned off from the on state. This overvoltage is generally as high as 2 to 2.5 times that of the power supply voltage supplied from the d.c. power source B. In the circuit shown in FIG. 1, this overvoltage must be blocked by the diode $D_1$ of high breakdown voltage rating. In the circuit shown in FIG. 3, however, such a diode is unnecessary, and the cost can be saved correspondingly. Further, there is no fear of destruction of the commutation failure detection circuit due to breakdown of the diodes by a surge voltage, and therefore, the reliability can be further improved.

FIG. 4 shows another embodiment of the present invention which is actually a modification of the first embodiment shown in FIG. 3.

Strict standards are presently provided for the wiring layout in electromobiles too from the aspect of safety and prevention of disasters. According to the standards, a fuse must necessarily be disposed at the outlet of each signal line outgoing from a main circuit so that the wire may not catch fire even when it is grounded due to strip-off of its insulation covering. The fuse is easily broken when subject to, for example, vibration. Therefore, detection of commutation failure may become impossible as described with reference to the circuit shown in FIG. 1 when the fuse is merely disposed at the outlet of the outgoing line in the circuit shown in FIG. 3.

In the second embodiment or modification shown in FIG. 4, therefore, fuses $F_1$, $F_2$ and $F_3$ are connected in series with the multiconnector terminals $MC_1$, $MC_2$ and $MC_4$ respectively, so that, even when one or more of the fuses $F_1$, $F_2$ and $F_3$ are broken, the protective circuit can exhibit the commutation failure detecting function described with reference to the first embodiment, thereby ensuring the safety at all times. It is apparent that the circuit shown in FIG. 4 is electrically exactly equivalent to that shown in FIG. 3.

Figure 5:
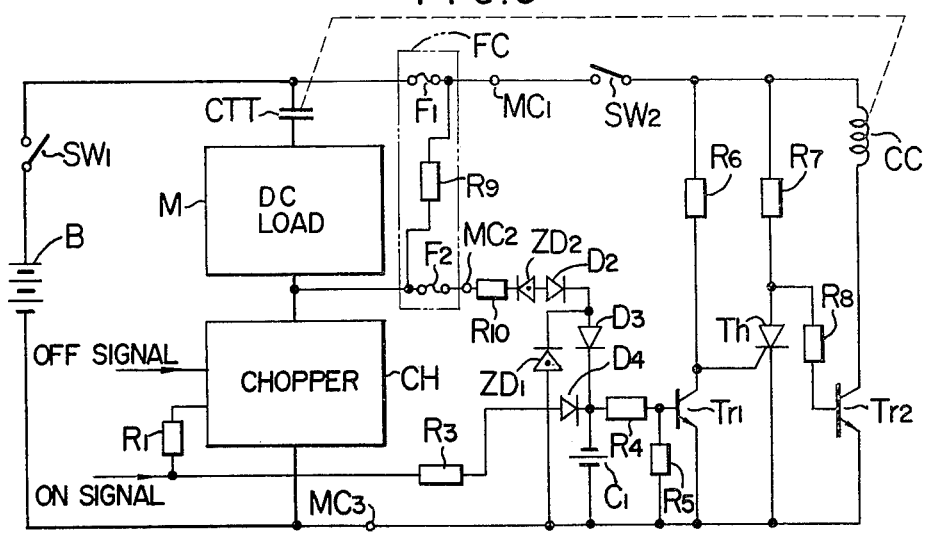

FIG. 5 shows still another embodiment of the present invention which is actually a modification of the second embodiment shown in FIG. 4. The circuit shown in FIG. 5 differs from that shown in FIG. 4 in that the fuse $F_3$ is eliminated. It is therefore unnecessary to describe the electrical operation of the circuit shown in FIG. 5 as it is entirely the same as that of the circuits shown in FIGS. 3 and 4.

A fuse used for the purpose of fire prevention should be primarily disposed in close vicinity to the main circuit. Generally, this fuse is housed within a fuse holder which is fixed by a mounting fixture or is mounted in a fixed mounting casing. A plurality of fuse holders are generally grouped and mounted in the same mounting casing for the sake of convenience of manufacture.

Referring to FIG. 5, the fuses $F_1$ and $F_2$ housed within individual fuse holders are mounted in a single mounting case FC. The fuse $F_3$ in FIG. 4 is eliminated, and the resistor $R_9$ is housed within the mounting casing FC. According to the arrangement shown in FIG. 5, grounding of the lead wire leading to the key switch $SW_2$ results in blowing of the fuse $F_1$, and the contactor CTT is immediately broken to prevent occurrence of fire. Even when the contactor CTT is kept made for some reason in such a case, the value of short-circuit current flowing through the load M and resistor $R_9$ is approximately equal to that of the normal current appearing when the chopper CH is operating with its 100% duty factor, that is, this current value is too small to cause overheating of the resistor $R_9$.

Upon grounding of the lead wire leading to the resistor $R_{10}$ in the state in which the contactor CTT is made, the fuse $F_2$ is blown out to actuate the commutation failure detection circuit thereby breaking the contactor CTT.

It will thus be seen that the fuses $F_1$, $F_2$ and resistor $R_9$ are housed within the same mounting casing FC to eliminate the fuse $F_3$ and multiconnector terminal $MC_4$ without in any way impairing the effect of fire prevention and while reducing the required costs.

Figure 6:
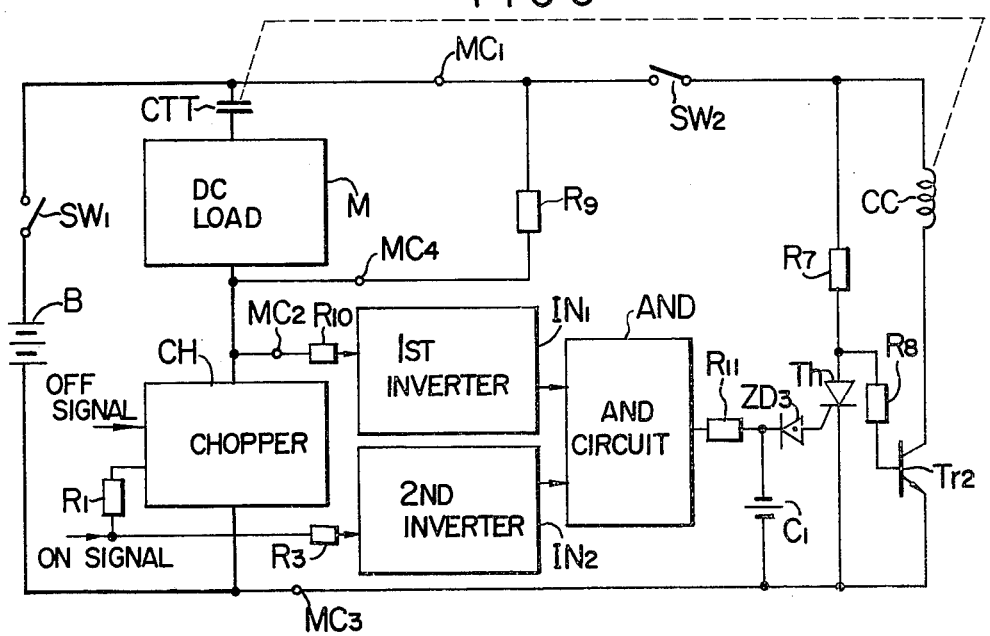

FIG. 6 shows yet another embodiment of the present invention which is actually a modification of the embodiment shown in FIG. 3. In the modification shown in FIG. 6, the logical circuit parts in FIG. 3 are replaced by inverters, an AND circuit, etc. Referring to FIG. 6, a first inverter $IN_1$ is connected to the resistor $R_{10}$ to invert the signal synchronous with the on-off of the chopper CH. A second inverter $IN_2$ is connected to the resistor $R_3$ to invert the signal corresponding to the chopper-on signal. The outputs of these inverters $IN_1$ and $IN_2$ are applied to an AND circuit AND from which an output of "1" level appears only when commutation failure of the chopper CH occurs. The phase of the signal synchronous with the on-off of the chopper CH is generally displaced by the commutation interval of the chopper CH from that of the signal corresponding to the chopper-on signal. Thus, an output of "1" level will appear from the AND circuit AND for a very short period of time which is generally in the order of 500 usec. However, the output appearing for such a short period is smoothed by the capacitor $C_1$ and does not exceed the Zener voltage of a Zener diode $ZD_3$. Upon occurrence of commutation failure of the chopper CH, an output of "1" level appears from the AND circuit AND, and the voltage of the capacitor $C_1$ exceeds the Zener voltage of the Zener diode $ZD_3$ to turn on the thyristor $T_h$ thereby breaking the contactor CTT.

It will be understood from the foregoing detailed description of the present invention that the d.c. load can be reliably disconnected from the d.c. power source thereby improving the safety in the event of malcontact or wire-breaking occurring in the interface between the main circuit and the protective circuit.

We claim:

1. A protective circuit for protecting a main d.c. circuit which is composed of a d.c. power source, a d.c. load connected at one terminal thereof to one terminal of said d.c. power source through switching means, and a chopper connected at one terminal thereof to the other terminal of said d.c. load and at the other terminal thereof to the other terminal of said d.c. power source, said protective circuit comprising:

first means including a first resistor connected in parallel with the series connection of said switching means and said d.c. load, for shunting said series connection with said first resistor;

second means connected at one terminal thereof through a connector, to a junction point to which said other terminal of said d.c. load, said one terminal of said chopper, and one terminal of said first resistor are connected, for delivering from the other terminal thereof a signal synchronous with on-off said chopper;

third means for detecting commutation failure of said chopper to produce an output signal, on the basis of the output signal of said second means and a signal corresponding to a chopper-on signal applied to said chopper; and fourth means for actuating said switching means in response to the output signal of said third means thereby disconnecting said d.c. load from said d.c. power source.

2. A protective circuit as claimed in claim 1, wherein said second means comprises a second resistor and a clipping circuit which clips at a predetermined level the signal appearing from said second resistor.

3. A protective circuit as claimed in claim 2, wherein a Zener diode is connected between said second resistor and said clipping circuit.

4. A protective circuit as claimed in claim 1, wherein said third means comprises a logic circuit providing the logical sum of the output signal of said second means and the signal corresponding to the chopper-on signal, a capacitor smoothing the output of said logic circuit, and a semiconductor switch adapted to be actuated to produce said output signal when the voltage across said capacitor is reduced to a level lower than a predetermined level.

5. A protective circuit as claimed in claim 1, wherein said third means comprises a logic circuit providing the logical sum of an inverted equivalent of the output signal of said second means and an inverted equivalent of the signal corresponding to the chopper-on signal, a capacitor smoothing the output of said logic circuit, and a semiconductor switch adapted to be actuated to produce said output signal when the voltage across said capacitor is reduced to a level lower than a predetermined level.

6. A protective circuit for protecting a main d.c. circuit which is composed of a d.c. power source, a d.c. load connected at one terminal thereof to one terminal of said d.c. power source through switching means, and a chopper connected at one terminal thereof to the other terminal of said d.c. load and at the other terminal thereof to the other terminal of said d.c. power source, said protective circuit comprising:

first means including a first resistor connected in parallel with the series connection of said switching means and said d.c. load through a first and a second fuse at the opposite ends of said series connection respectively, for shunting said series connection with said resistor;

second means connected at one terminal thereof to the connection point of said d.c. load and said chopper through a third fuse for delivering from the other terminal thereof a signal synchronous with on-off of said chopper;

third means for detecting commutation failure of said chopper to produce an output signal, on the basis of the output signal of said second means and a signal corresponding to a chopper-on signal applied to said chopper; and fourth means for actuating said switching means in response to the output signal of said third means thereby disconnecting said d.c. load from said d.c. power source.

7. A protective circuit as claimed in claim 6, wherein said second means comprises a second resistor and a clipping circuit which clips at a predetermined level the signal appearing from said second resistor.

8. A protective circuit as claimed in claim 7, wherein a Zener diode is connected between said second resistor and said clipping circuit.

9. A protective circuit as claimed in claim 6, wherein said third means comprises a logic circuit providing the logical sum of the output signal of said second means and the signal corresponding to the chopper-on signal, a capacitor smoothing the output of said logic circuit, and a semiconductor switch adapted to be actuated to produce said output signal when the voltage across said capacitor is reduced to a level lower than a predetermined level.

10. A protective circuit for protecting a main d.c. circuit which is composed of a d.c. power source, a d.c. load connected at one terminal thereof to one terminal of said d.c. power source through switching means, and a chopper connected at one terminal thereof to the other terminal of said d.c. load and at the other terminal thereof to the other terminal of said d.c. power source, said protective circuit comprising:

first means including a resistor connected at one terminal thereof through a first fuse to one terminal of said switching means whose other terminal is connected to said one terminal of said d.c. load and at the other terminal thereof to said one terminal of said chopper, for shunting the series connection of said switching means and said d.c. load with said resistor;

second means connected at one terminal thereof, through a series connection of a connector and a second fuse, to junction point to which said other terminal of said d.c. load, said one terminal of said chopper, and said other terminal of said resistor are connected, for delivering from the other terminal thereof a signal synchronous with on-off of said chopper;

third means for detecting commutation failure of said chopper to produce an output signal, on the basis of the output signal of said second means and a signal corresponding to a chopper-on signal applied to said chopper; and fourth means for actuating said switching means in response to the output signal of said third means thereby disconnecting said d.c. load from said d.c. power source.

11. A protective circuit as claimed in claim 10, wherein said first fuse and said resistor are housed together with said second fuse within one and the same casing.

* * * * *